United States Patent
Chen et al.

(10) Patent No.: US 6,201,793 B1
(45) Date of Patent: Mar. 13, 2001

(54) PACKET DELAY ESTIMATION IN HIGH SPEED PACKET SWITCHES

(75) Inventors: Xiaoqiang Chen, Morganville; Denis Andreyevich Khotimsky, Eatontown, both of NJ (US)

(73) Assignee: Lucent Technologies, Murray Hill, NJ (US)

( * ) Notice: Subject to any disclaimer, the term of this patent is extended or adjusted under 35 U.S.C. 154(b) by 0 days.

(21) Appl. No.: 09/039,699

(22) Filed: Mar. 16, 1998

(51) Int. Cl.$^7$ ................................................ H04L 12/56
(52) U.S. Cl. ........................ 370/238; 370/252; 370/412
(58) Field of Search .......................... 370/230, 231–237, 370/412, 417, 418, 252, 238; 710/60; 711/151

(56) References Cited

U.S. PATENT DOCUMENTS

| | | | |
|---|---|---|---|
| 5,450,394 | * | 9/1995 | Gruber et al. ........................ 370/253 |
| 5,796,719 | * | 8/1998 | Peris et al. ............................ 370/231 |
| 5,848,056 | * | 12/1998 | Meurisse et al. ..................... 370/232 |
| 5,999,534 | * | 12/1999 | Kim ...................................... 370/395 |

* cited by examiner

*Primary Examiner*—Seema S. Rao
(74) *Attorney, Agent, or Firm*—Henry T Brendzel

(57) ABSTRACT

An improved packet delay estimation method results from an indirect measurement method that employs an estimation method based on sampled lengths of queues and measured traffic. A complex system of queues sharing the same constant rate server and driven by a non-trivial scheduling scheme is split into logical clusters of queues. The method estimates packet delay based on a two-level approximation. On the first level of approximation, effects of the fact that the server is shared by other clusters is approximated by an equivalent reduction of the service rate. On the second level of approximation, individual queue lengths within a cluster are sampled and, based on the knowledge of the scheduling discipline, used to obtain the upper and lower bounds on the occupancy of the equivalent FIFO buffer. Estimate of the delay is found based on the effective buffer occupancy, and the effective service capacity.

8 Claims, 2 Drawing Sheets

PACKET DELAY ESTIMATION IN HIGH SPEED PACKET SWITCHES

BACKGROUND

In packet-switching communications networks, user information is carried in packets which are routed from the source towards the destination via switches or routers. The switch buffers each packet received from the upstream direction until a decision is made when and on which outgoing link the packet would be forwarded. The time that a packet takes to reach the destination after it leaves the source is called end-to-end packet delay. Different packets travelling between the same source/destination pair may experience different delays which depend on traffic conditions and level of congestion in different switches, scheduling and management policy, and other deterministic and/or random factors.

The end-to-end delay accumulates the link transmission delays, propagation delays and switch processing delays along the route. Whereas the transmission delays and propagation delays are determined by the packet size and the fixed link parameters (capacity, length and signal propagation speed in the medium) and therefore are predictable with small error, the switch processing delays are subject to much larger random deviations. The single main contributor to the switch processing delay is the queuing delay in a switch's buffer.

In-service measurement of packet delay in a switch is an important source of network management information. It allows the switch to monitor the existing level of congestion, to provision a selected quality-of-service, as well as to support other management functions, including admission of a new connection, path selection and load balancing.

The in-service measurements are required on a per-flow basis, i.e., with respect to specific spatial source-destination pairs and to specific packet loss and service priorities. Since the delays of individual packets are experienced at arbitrary moments of time and are, therefore, random variables, the values arrived at in the course of measurement are merely samples from a stochastic process, and therefore require an estimation procedure.

Conventional direct measurements are based on timestamping. When a packet is enqueued, it is assigned a numerical value associated with the current time or clock cycle number. This value is stored with the packet. When the packet is dequeued, the difference between the new current time or clock cycle number and the value stored with the packet constitute a sampled queuing delay. However, packet timestamping in a high-speed packet switch where the number of the simultaneously buffered packets is significantly large incurs significant overhead associated with the buffer space allocated for the timestamps. Therefore, in high-speed packet switches, the direct measurement methods may be unavailable or undesirable.

SUMMARY

Unlike prior art timestamping techniques, the disclosed packet delay estimation method is indirect, as it is based on sampling the queue lengths and measuring the traffic load.

In accordance with the present disclosure, a complex system of queues sharing the same constant rate server, i.e., a switch or a router with associated fixed capacity transmission link, and driven by a sophisticated, albeit known, scheduling scheme is split into logical clusters of queues. The disclosed method estimates packet delay based on a two-level approximation. On the first level of approximation, effects of the fact that the server is shared by other clusters is approximated by an equivalent reduction of the service rate (a concept of effective service capacity). On the second level of approximation, the sampled individual queue lengths within a cluster, coupled with the knowledge of the scheduling discipline, are used to obtain the upper and lower bounds on the occupancy of the equivalent FIFO buffer (a concept of effective buffer occupancy).

Estimate of the delay is then found based on the effective buffer occupancy, and the effective service capacity.

DETAILED DESCRIPTION

Figure 1:
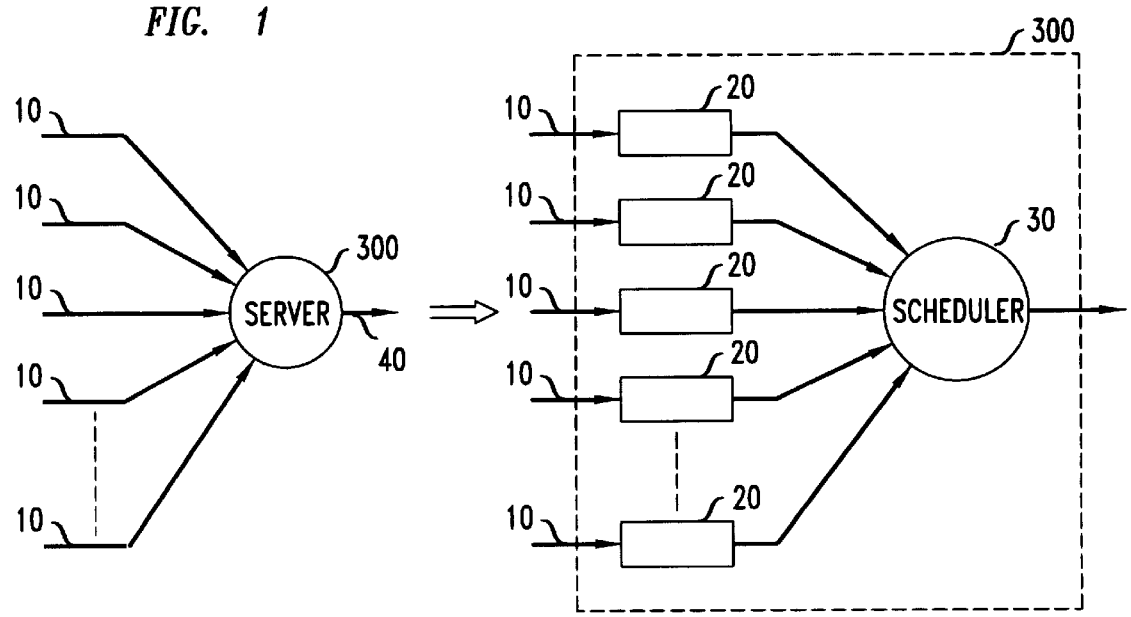
FIG. 1 shows a model of a switch/router that, with the aid of buffers, services a plurality of links.
Figure 2:
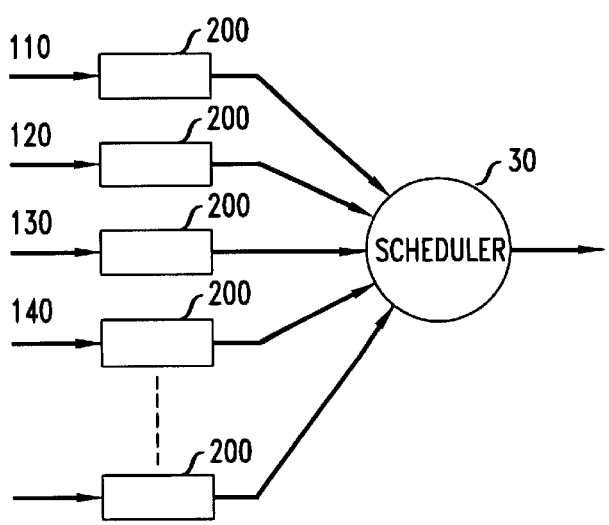
FIG. 2 presents an arrangement where the links of the FIG. 1 model are arranged in clusters.

A packet switch comprises a plurality of input and output links and an interconnection network. Each output link can be represented by a constant-rate server whose capacity is equal to the link transmission rate. In general, before being transmitted over the output link, the traffic requires queuing. The packets which are switched from different input links to the given output link may be treated non-uniformly because of various considerations and, therefore, queued separately. This is illustrated in FIG. 1 where a set of buffers 20, each connected to input flow 10, is associated with server 300 and output link 40. For example, the incoming traffic may belong to different source-destination flows, different Quality-Of-Service classes, or different priorities within a class, the schema of scheduling service may favor some links, etc. Considering the different treatment to which different traffic is subjected, in accordance with the principles of this invention, all queues associated with the same output link of the switch are split into logical clusters. This is depicted in FIG. 2, where, illustratively, the queues are arranged into four clusters, each of which has an equivalent buffer 200.

In accordance with the disclosed method, the effective packet delay through the switch is estimated based on sampled lengths of the queues within the switch, i.e., buffer 200, and the measured traffic to the switch. The method estimates packet delay of a cluster based on a two-level approximation. On the first level of approximation, the effect of the switch being shared by other clusters is approximated by an equivalent reduction of the service rate (effective service capacity) to the cluster. On the second level of approximation, individual queue lengths within a cluster are sampled and, based on the knowledge of the scheduling discipline, used to obtain the upper and lower bounds on the occupancy of the equivalent buffer with First-In-First-Out service discipline (effective buffer occupancy).

Estimation of the effective service capacity offered to a given cluster, while there is at least one non-empty buffer in the cluster, is performed with the knowledge of offered load, i.e., the ratio of the number of packet arrivals to the specific queue cluster within some interval of time to the total number of packets that could be possibly served within the same interval of time by the corresponding output link server operating at its maximum capacity. The offered load can be found using the packet arriver counters, which easy to implement and are usually provided by all packet switch vendors.

We found that for a system which contains a set of buffers or buffer clusters being serviced by a common switch with non-prioritized scheduling discipline, a viable formula for the effective service capacity of a cluster j, $c_j$ is $$c_j = 1 - \rho K_j \quad (1)$$

where ρ is the total offered load of the switch, and the correction coefficient K is determined in terms of the total offered load and the values of offered load of individual clusters. FIG. 2 illustratively shows clusters 110, 120, 130, and 140. Specifically, we found that the following formula for K works well:

$$K_j = \frac{\rho - \rho_j}{\rho - \rho_j + \rho_{max}}, \quad (2)$$

where $\rho_{max}$ is the offered load of the busiest cluster, i.e., the cluster having the highest number of packet arrivals within the same time interval.

The application of the approximation scheme is explained below using the often-used simple round robin scheduler (SRR) as an example. The N queues sharing the same switch operating under the SRR scheduling discipline are visited in consecutive pre-established order. If a queue is not empty, exactly one packet is served from this queue. If a queue is empty, no credit is given, and the scheduler instantaneously advances to the next queue in the pre-established order. If all queues are empty, the packet slot is wasted.

Under such operating procedures, the effective service capacity, i.e., the average service rate, expressed in the units of packets per packet processing slot, that is enjoyed by the given queue or logical group of queues while the queue or group of queues is non-empty, depends on both the total offered load and the partition of the offered load between different clusters sharing the switch. The following properties of approximation (2) of the effective service capacity are easily observable:

the effective service capacity is bounded from below by 1/N due to the guaranteed nature of the service (every cycle of the scheduler, each link is offered service once);

if the total utilization is high and the offered load of one of the queues is much smaller than those of the others, its effective service capacity is close to the lower bound (because each of the other queues does utilize a slot whenever it is serviced and offered one);

if the total load is low and uniformly distributed between all queues, each queue in its busy period enjoys close to the entire capacity of the switch.

To illustrate the method of determining the effective service capacity, consider an example where all links of a switch share the same type of traffic, and round-robin scheduler schema is employed (the FIG. 1 arrangement applies). Assume further that there are 6 input links and that the packet arrival counters give the following readings for the 6 queues in a switch over the same time interval having length T=2400:

$n_1 = n_2 = 1000$,
$n_3 = n_4 = 2000$,
$n_5 = 4000$,
$n_6 = 6000$

The total offered load of the switch and the maximum offered load of the switch are:

$\rho = 1600/2400 = 2/3$,
$\rho_{max} = 6000/2400 = 10/4$.

The effective service capacity of the least loaded queue (e.g., $n_1$) is then estimated as $$c_1 = 1 - \frac{2}{3}\left(\frac{150/24}{210/24}\right) \approx 0.524,$$

and the effective service capacity of the most loaded queue is estimated as $$c_1 = 1 - \frac{2}{3}\left(\frac{100/24}{160/24}\right) \approx 0.583$$

The above addressed an arrangement where service was not prioritized. Assuming now a system with prioritized service and no service bandwidth reservation, i.e., no service bandwidth is guaranteed to any cluster other than the highest priority cluster, the arrangement of FIG. 2 is the appropriate model. By "prioritized service" we contemplate an arrangement where each cluster has a unique priority and the scheduler within the switch addresses the clusters by order of their priority. When a cluster is addressed, the packets stored in its buffers are services until all such packets are transmitted, or a cluster with a higher priority becomes backlogged, i.e., at least one packet arrived to one of the queues of the higher-priority queue cluster. In the latter case, the higher-priority cluster preempts service to the lower-priority cluster. When the buffers of the currently served cluster become empty, and all higher priority buffers are still empty, the scheduler addresses the next-highest priority cluster. For such an arrangement, the effective service capacity of a cluster can be approximated by $$c_j = 1 - \sum_{\{\pi(i) > \pi(j)\}} \rho_i \quad (3)$$

where summation is taken over clusters with higher service priority π(i) than that of queue j, π(j).

In a system with prioritized service and bandwidth reservation, where each queue j has a reserved fraction of the service capacity $\omega_j$, the effective service capacity is, again, different. In a bandwidth reservation arrangement, provision of the reserved bandwidth has the highest precedence. First, the reserved bandwidth is offered to the various links according to a preassigned bandwidth reservation scheme. As long as all buffers are busy, that is all that any other buffer can get. At times, however, a buffer is addressed by the scheduler, but it is empty at that time, and so are the buffers of all other links in the cluster. At such a time, other clusters can receive service, and that service is offered in accordance with whatever prioritization arrangement is in place. Hence, in an arrangement with prioritized service and bandwidth reservation, where excessive bandwidth is shared on the priority basis, the approximation formula for the effective service capacity is:

$$c_j = 1 - \min\left\{\left(\sum_{\{\pi(i) > \pi(j)\}} \rho_i + \sum_{\{\lambda(i) < \pi(j)\}} \min\{\rho_i, w_i\}\right), (1 - w_j)\right\}. \quad (4)$$

What the above equation says is that the traffic capacity that is not given to cluster j is the smaller of two terms. The first term is the sum of the bandwidths reserved for other clusters, while the second term is sum of the loads of clusters which have a higher priority than that of cluster j, plus the reserved bandwidths of clusters with lower priority than that of cluster j, whichever is smaller.

The above illustrated how the effective service capacity is determined for three different illustrative examples. Of course, the effective service capacity for other arrangements can be determined by following the above teachings, taking into account the characteristics of the particular arrangement under consideration.

We address now the effective buffer occupancy. For a queue with the FIFO service discipline, the queuing delay D is directly related to the queue length, or buffer occupancy, q, at the time of the packet's arrival. It is also inversely related to the service rate, c. If the service rate of packets is constant, then the delay relationship is simply D=q/c.

If the service scheme is "round-robin", it is clear that a packet that arrives later to one of the shorter queues (that share the same switch) can be dispatched before the given packet. The notion of effective buffer occupancy captures this non-FIFO nature of service. The delay for a packet arriving to a cluster would then be the effective buffer occupancy of the cluster divided by the effective service capacity of the cluster.

To determine the effective buffer occupancy, knowledge of the service discipline and a snapshot of the number of packets in the buffers at the arrival instant are essential. However, since due to non-FIFO nature of the service discipline the future arrivals can affect the queuing delay of the packet, the effective occupancy and corresponding delay estimates can, at best, be obtained in the form of bounds.

Figure 3:
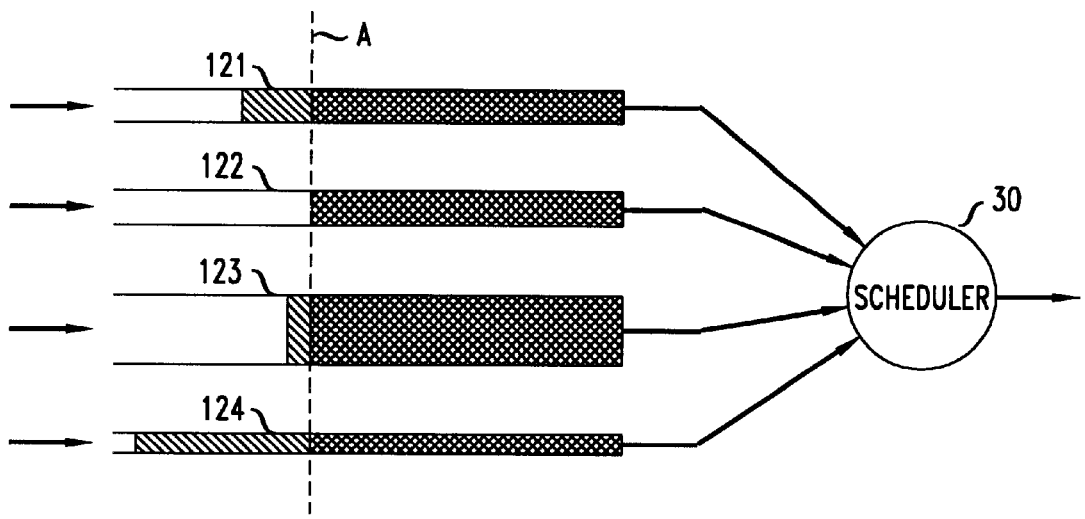
FIGS. 3 and 4 illustrate two buffer fullness conditions for the FIG. 2 arrangement.
Figure 4:
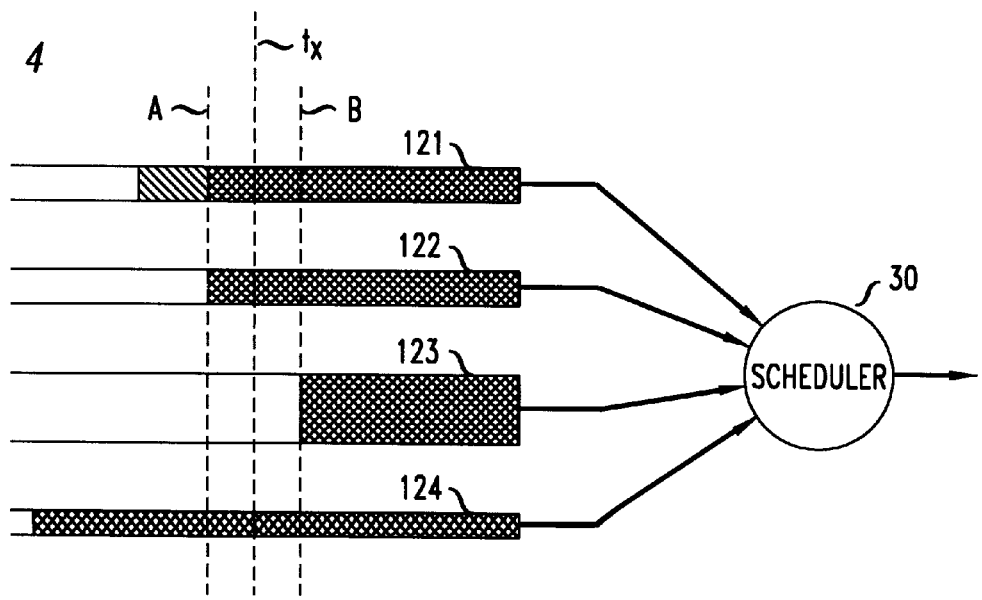

A clearer understanding of the above may be had with the aid of FIGS. 3–4 where four buffers of a single cluster of queues of FIG. 2 are illustrated with different existing occupancy levels of individual buffers. It is assumed that the FIGS. 3–4 arrangements correspond to a bandwidth reservation system with prioritized service, and that the bandwidth reserved for each buffer is delineated by the width (i.e. vertical span) of each buffer. It is further assumed that buffer 122 has a new packet arriving, and that buffer 121 has higher priority. The question to be resolved is "what is the effective buffer occupancy observed by the packet arriving to buffer 122".

Each buffer within the cluster is guaranteed to receive its reserved fraction of the service bandwidth, which is in fixed proportion to the guaranteed bandwidth of buffer 122. Therefore, any packet which, at the time of the given packet arrival, is already enqueued in the aggregated area to the right of the vertical line passing through the current occupancy level of buffer 122 is guaranteed to be served ahead of the given packet. On the other hand, if at the moment of the given packet arrival this area is completely filled, no other packet which may arrive later to the cluster will be serviced ahead of the given packet of buffer 122. As it may be concluded, this aggregated area constitutes the upper bound on the effective buffer occupancy observed by the packet arriving to buffer 122.

In FIG. 3, if each buffer was served at its reserved bandwidth and no new arrivals occurred, it would be buffer 122 that would be emptied first. Accordingly, those and only those packets which belong to the crosshatched areas of buffers 121–124 will be serviced before the new packet arriving to buffer 122. One can say, therefore, that in this case the effective buffer occupancy observed by the arriving packet is equal to the upper bound.

In FIG. 4, the situation is different. Here, buffer 123 has lower occupancy level than buffer 122. Consequently, if no new arrivals occurred, buffer 123 would be emptied first and its unused service capacity may advantageously be used by packets of other buffers. Because of the priority-based sharing of the unclaimed service bandwidth, packets of buffers that have a higher priority than buffer 122 (for example, packets of buffer 121) would get advantage over packets of buffer 122. Of course, if no buffers are found with a higher priority, or those buffers are empty, or those buffers garner some of the capacity left unused by buffer 123, but there is still some capacity left, then the packet arriving at buffer 122 will be serviced sooner than expected. In such a circumstance, the effective buffer occupancy observed by a packet arriving to buffer 122 would be lower than the upper bound.

Since it is not known how many packets may arrive for buffer 123 or 121 while the packet of interest is waiting to be serviced, it is not possible to provide a deterministic value for the effective buffer occupancy. Still, upper and lower bounds can be ascertained. Whereas the upper bound is the total number of packets which will be served ahead of the given packet, provided every buffer has sufficiently large number of new arrivals to claim all its reserved bandwidth, the lower bound corresponds to the number of packets which would receive service ahead of the given packet, if no new arrivals occurred. In the FIG. 4 illustration, for example, if the number of packets in buffers 121, 122, 123, and 124 is 1300, 1000, 1400, and 1000, respectively, with reserved (relative) bandwidths 10, 10, 20, and 6, respectively, then the bounds on effective buffer occupancy observed by the packet arriving to buffer 122 can be found as follows. The upper bound is equal to 4600, which is the ratio of the actual occupancy of the buffer to its normalized reserved bandwidth. The lower bound is equal to 4300, because out of 600 buffer locations which are presently available in buffer 123, 300 are taken by the higher-priority buffer 121 while the rest in effect are used by buffer 122.

Generalizing the above, we note that the upper bound on the effective buffer occupancy of queue j belonging to some queue cluster can be found as a ratio of the actual occupancy $q_j$ of queue j to its service capacity reservation $\omega_j$ normalized within the cluster.

To find the lower bound on the effective buffer occupancy, we define, for any queue i belonging to the cluster, an allocation of queue i in respect to a packet which arrives to queue j and finds $q_j$ packets already queued in front of it in this queue as a number of queue i's packets that could have been serviced before the reference packet due to queue i's bandwidth reservation. Easy to see that allocation of queue i is given by $q_j\omega_i|\omega_j$. The positive difference between the allocation of queue i and its actual occupancy q will be referred to as vacancy of queue i. Then the lower bound on effective buffer occupancy in respect to the reference packet is a total of two components:

1. the sum of the number of packets enqueued in all queues (including the reference queue) of the given cluster which don't exceed allocation of the respective queue;
2. the smaller of
   the sum of the number of packets enqueued in the queues with higher priority than that of the reference queue in excess of their respective allocations, and
   the sum of the vacancies of the queues with lower priority than that of the reference queue.

This is equivalent to the smaller of
   the sum of the total number of packets enqueued in the higher priority queues, the actual number of packets in the reference queue, and the number of packets in the lower priority queues below their respective allocations, and
   the effective occupancy's upper bound.

As an aside, the example above is tuned, of course, to the specified arrangement where there is bandwidth guarantee with prioritization. In an arrangement where there is no bandwidth guarantee, the lower bound on the effective buffer occupancy of a cluster is simply the buffer occupancy of the cluster plus the sum of the buffer occupancies of all clusters that have a higher priority. If the reference queue does not have reserved service bandwidth, its effective buffer occupancy does not possess finite upper bound.

To generalize further, the delay estimation procedure consists of two stages: the off-line analysis and the in-service sampling. The off-line analysis stage includes the following steps:

1. Given a complex queuing system with the known scheduling discipline, establish its logical partition into queue clusters each of which can be considered as an individual queue on the first level of approximation.

2. Establish the appropriate effective service capacity approximation formulae which can be used to estimate the average service rate enjoyed by a component queue cluster in its busy period.

3. For each queue cluster viewed, on the second level of approximation, as a collection of FIFO queues, establish an appropriate formula of the effective buffer occupancy which can be used to determine the bounds of the queuing delay, given the effective service bandwidth. The in-service sampling includes the following actions performed periodically:

1. Sample and aggregate the packet arrival counters to obtain the average offered load per each queue cluster, use this information to obtain the effective service capacity enjoyed by each queue cluster over certain time period—an update interval.

2. Within each update interval sample the lengths of the individual sub-queues within each cluster to obtain their effective occupancy.

3. Use the composition of the results of procedures (1) and (2), applying the effective service capacity as a value of the constant service rate for the effective buffer occupancy to obtain the estimates of the moments, bounds, or distribution functions of the packet delay for each relevant queue.

The above discussion centered on a cluster's effective service capacity, on a cluster's effective buffer occupancy, and the resultant effective delay through the cluster. It, of course, follows that the same assessments can be made for buffers of specific links of a cluster. That is, given an evaluated effective service capacity of a cluster under consideration, as far as the individual buffers within the cluster are concerned, they are arranged as in FIG. 1, and the effective service capacity for the buffer follows equations (1) and (2) to yield a fraction of the service capacity of the cluster. The effective buffer occupancy extension to a specific buffer is even simpler. It is bounded on the upper side by the actual buffer occupancy, and on the lower side by the same percentage reduction that the entire cluster is enjoying.

We claim:

1. A method of packet delay estimation in a switch having a plurality of input links which may be assigned to clusters, where each cluster is serviced differently by a scheduler of said switch but all links in a cluster are serviced similarly, and where each link has an associated buffer for storing incoming packets until they are outputted by said switch onto output-links of said switch, the method comprising the steps of:

for each cluster, measuring buffer load of said cluster, which corresponds to the number of packets that await servicing by said scheduler which are stored in buffers of links assigned to said cluster;

for at least one cluster (cluster i), determining a reduction in service rate for said cluster i by said scheduler because of service provided by said scheduler to clusters other than cluster i, to obtain thereby an effective service capacity for said cluster i;

for said cluster i, determining an effective buffer occupancy of said cluster i to be less than or equal to the measured buffer load of said cluster i and greater than or equal to a measure that accounts for clusters that are serviced in a manner that empties those clusters more quickly than the servicing of said cluster i would empty cluster i, and that accounts for buffer load of clusters having a higher priority than that of said cluster i; and evaluating an estimated range of packet delay through said cluster i based on said effective service capacity of said cluster i and said effective buffer occupancy of said cluster i.

2. The method of claim 1 further comprising a step of refining said estimated range of packet delay through said cluster i, to determine an estimated range of packet delay through a link belonging to said cluster i.

3. The method of claim 2 where said step of refining comprises a step of evaluating an effective service capacity for said link belonging to said cluster i, evaluating an effective buffer occupancy for said link belonging to said cluster i, and evaluating said estimated range of packet delay for said link belonging to said cluster i by with the aid of said effective service capacity for said link belonging to said cluster i and said an effective buffer occupancy for said link belonging to said cluster i.

4. The method of claim 1 where the step of determining a reduction of service for cluster develops a measure for the effective service capacity of cluster i, $c_i$, by the equation $$c_j = 1 - \sum_{\{\pi(i) > \pi(j)\}} \rho_i$$

where $\rho_i$ is the load of cluster i, and the summation is taken over clusters with higher service priority $\pi(i)$ than that of queue j, $\pi(j)$.

5. The method of claim 1 where the step of determining a reduction of service for cluster i develops a measure for the effective service capacity of cluster i, $c_i$, by the equation $$c_j = 1 - \min\left\{\left(\sum_{\{\pi(i) > \pi(j)\}} \rho_i + \sum_{\{\lambda(i) < \pi(j)\}} \min\{\rho_i, w_i\}\right), (1 - w_j)\right\},$$

, where $\rho_i$ is the load of cluster i, $\pi(i)$ is the priority of cluster i, and $\omega_i$ is a reserved bandwidth for cluster i.

6. The method of claim 1 where said scheduler provides different service to different ones of said clusters because said different ones of said clusters are serviced with different priority designations.

7. The method of claim 1 where said scheduler provides different service to different ones of said clusters because said different ones of said clusters are serviced with different bandwidth reservation.

8. The method of claim 1 where said scheduler provides different service to different ones of said clusters because said different ones of said clusters are serviced either with different priority, or with different bandwidth reservation, or both.

* * * * *